Nov. 11, 1952     N. W. KRASTEL ET AL     2,617,617

CHRISTMAS TREE CLAMP AND SUPPORTING STANDARD

Filed March 21, 1950

INVENTORS
Norman W. Krastel
Robert D. Krastel
BY
W. S. McDowell
ATTORNEY

Patented Nov. 11, 1952

2,617,617

UNITED STATES PATENT OFFICE 2,617,617

CHRISTMAS TREE CLAMP AND SUPPORTING STANDARD

Norman Wilbur Krastel and Robert Dale Krastel, Columbus, Ohio, assignors to Oscar J. Krastel, Columbus, Ohio Application March 21, 1950, Serial No. 150,884

1 Claim. (Cl. 248—44)

The present invention relates to tree-supporting standards or holders of the type adapted to support an object, such as a Christmas tree, in an upright position and in a manner to prevent the tree from toppling or falling over from such upright position.

The primary object of the present invention is to provide an improved Christmas tree holder which comprises but few and relatively simple parts, and which functions to efficiently and rigidly support a Christmas tree in an upright position with respect to an associated supporting surface, such as the floor of a room.

It is another object of the present invention to provide a Christmas tree holder which comprises a base unit which is positioned upon the floor or other supporting surface, and a detachable clamping unit which may be initially detached from the base and clamped to the trunk of a tree to be supported by the device, and which may be thereafter moved in association with the tree into engagement with the base section to rigidly support the tree in an upright position.

A further object of the present invention is to provide a Christmas tree holder which embodies a receptacle member into which may be introduced water or moist sand or sawdust for purposes of maintaining a tree supported by the device in a moist condition, thereby to prolong the lifelike appearance of the tree and to prevent premature drying of the tree and consequent loosening of the needles or leaves thereof.

For a further and more detailed understanding of the present invention, and the various additional objects and advantages realized therefrom, reference is made to the following description and accompanying drawing, wherein.

Figure 1:
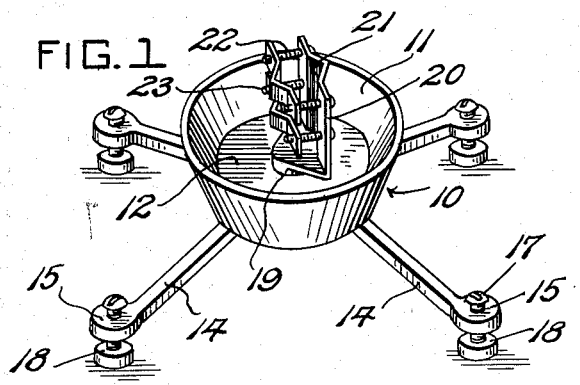
Fig. 1 is a perspective view of a Christmas tree holder formed in accordance with the present invention.
Figure 2:
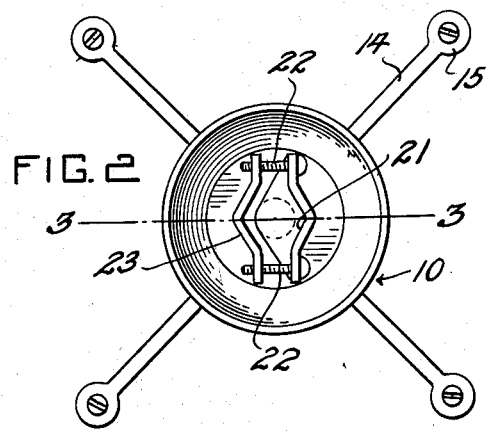
Fig. 2 is a top plan view of the holder.

Referring now to the drawing, the present Christmas tree holder comprises a base receptacle 10 embodying a circular side wall 11 and a bottom wall 12. The side wall 11 of the receptacle is tapered downwardly, and defines with the bottom wall 12 a relatively shallow open-topped chamber. The bottom wall 12 of the receptacle is formed at its central region with a downwardly tapered vertically arranged socket 13. Rigidly secured to the under surface of the bottom wall 12 are the inner ends of a plurality of outwardly and downwardly radiating legs 14. Each of the legs 14 terminate in angularly related substantially horizontal bosses 15 which are provided with centrally disposed screw-threaded openings 16. The screw-threaded openings 16 receive cooperatively threaded bolts or screw devices 17 which carry at their lower ends relatively enlarged floor-engaging pads 18. The individual bolts or screw devices 17 may be adjusted vertically within the screw-threaded openings 16 of the legs, in order to level the base receptacle 10 with respect to a floor or other supporting surface.

Figure 3:
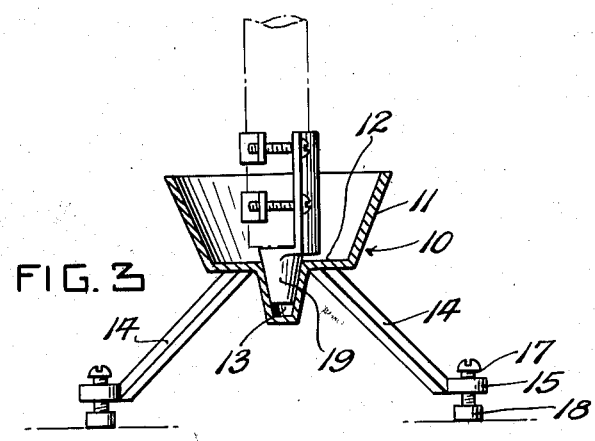
Fig. 3 is a transverse vertical sectional view taken along the line 3—3 of Fig. 2.
Figure 4:
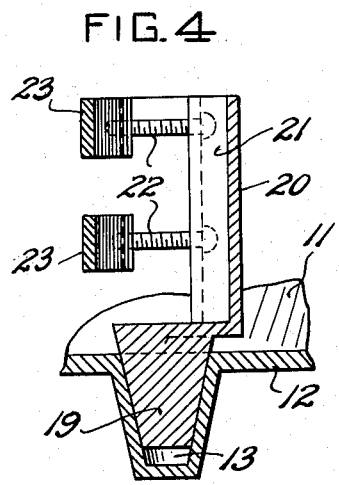
Fig. 4 is an enlarged detailed vertical sectional view taken through the base receptacle and clamping bracket, and showing the taper-lock connection between the detachable clamp bracket and the base unit of the present Christmas tree holder.
Figure 5:
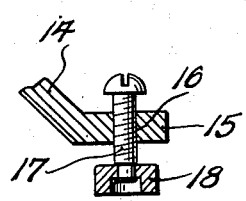
Fig. 5 is an enlarged fragmentary vertical sectional view taken through the outer end region of one of the legs of the present Christmas tree holder.

Detachably carried within the tapered socket 13 formed in the bottom wall of the base receptacle is a cooperatively tapered frustoconical plug member 19 which forms an end extension to an upstanding bracket plate 20. The bracket plate 20 and plug member 19 are preferably formed as an integral casting, and the plate 20 is provided with a longitudinally extending V-shaped channel or recess 21. The outer sides of the bracket 20 are flat, and are formed on either side with a pair of vertically spaced bolt-receiving openings through which extend a plurality of screw-threaded bolts 22. The individual sets of vertically spaced bolts 22 extend within screw-threaded openings formed in either end of a pair of clamping brackets 23. As shown particularly in Fig. 3, the vertically spaced clamping brackets 23 are arranged to be moved inwardly toward the stationary bracket 21 by tightening of the bolts 22. The bracket plate 21 and clamps 23 may be detached from the base receptacle 10 and applied to the lower end of a tree trunk, as indicated by broken lines in Fig. 3, and thereafter tightened around the tree trunk to securely clamp the same between the clamps 23 and the bracket plate 20. The V-shaped recesses provided in the clamps and the bracket plate 20 engage opposite sides of the tree trunk, and adapt the bracket for attachment to various diameter tree trunks simply by adjusting the bolts 22 to draw the clamps 23 into tight-fitting engagement with the associated tree trunk.

After application of the clamping bracket to the lower end of the three trunk, the tree and bracket may be lifted bodily and the tapered plug 19 inverted within the socket 13 formed in the bottom wall of the base receptacle. The weight of the tree and clamping brackets serve to force the tapered plug member 19 downwardly within the tapered socket 13 and wedge the former into tight-fitting engagement with the walls of the socket to thereby prevent relative rotation between the clamping brackets and the base receptacle. After adjusting the tree to its desired position with respect to the base receptacle, the chamber provided by the receptacle may be filled with water, moist sand, moist sawdust, or the like, to cover the lower portion of the tree trunk carried within the clamping brackets. In this manner, the tree may assimilate moisture through its trunk and thereby prolong its lifelike appearance.

In view of the foregoing, it will be seen that the present invention provides a useful and efficient tree-supporting standard or holder which is characterized by its ease of application to the tree, made possible through the provision of the separate base and clamping sections. A further advantage realized from the present tree holding construction stems from the fact that the base receptacle 10 provides a convenient means for supplying an associated tree with moisture while at the same time rigidly and firmly supporting the same against overturning. Further, in employing a liquid surrounding the base region of the tree, fire hazards normally associated with Christmas trees are reduced, by preventing the tree from drying out, and thereby becoming relatively highly inflammable.

While a single preferred embodiment of the present invention has been disclosed in detail, it will be manifest that various modifications are possible without departing from the spirit of the invention or the scope of the following claim.

We claim:

A Christmas tree holder comprising an open-top receptacle including a bottom wall formed with a downwardly extending tapered socket; a plurality of leg members radiating outwardly and downwardly from said receptacle, said leg member being formed at their outer ends with vertically arranged screw-threaded openings; leveling screws carried within the openings formed in said leg members; and a three-clamping bracket formed with a tapered end extension for removable insertion within the tapered socket formed in said bottom wall, said bracket being provided with a plurality of relatively spaced clamp members for clamping engagement with the trunk of a tree to be supported by said holder, and being removable from the socket of said receptacle for attachment to and detachment from the trunk of a tree.

NORMAN WILBUR KRASTEL.
ROBERT DALE KRASTEL.

REFERENCES CITED

The following references are of record in the file of this patent:

UNITED STATES PATENTS

| Number | Name | Date |
|---|---|---|
| 224,624 | Albrecht | Feb. 17, 1880 |
| 774,497 | Rompel | Nov. 8, 1904 |
| 1,598,362 | Brice | Aug. 31, 1926 |
| 2,317,049 | Ginka | Apr. 20, 1943 |

FOREIGN PATENTS

| Number | Country | Date |
|---|---|---|
| 545,486 | Great Britain | May 28, 1942 |